US007937323B2

(12) United States Patent
Wagner et al.

(10) Patent No.: US 7,937,323 B2
(45) Date of Patent: May 3, 2011

(54) DATA SOURCE INDEPENDENT INTERFACE FOR AN ELECTRONIC BILL PRESENTMENT AND PAYMENT SYSTEM

(75) Inventors: Richard M. Wagner, South Hadley, MA (US); William D. Clarke, Florence, MA (US)

(73) Assignee: Pitney Bowes Inc., Stamford, CT (US)

( * ) Notice: Subject to any disclaimer, the term of this patent is extended or adjusted under 35 U.S.C. 154(b) by 2653 days.

(21) Appl. No.: 10/260,593

(22) Filed: Sep. 30, 2002

(65) Prior Publication Data

US 2003/0220873 A1 Nov. 27, 2003

Related U.S. Application Data

(60) Provisional application No. 60/382,707, filed on May 22, 2002.

(51) Int. Cl.
*G06Q 40/00* (2006.01)
(52) U.S. Cl. .................................... 705/40; 705/34
(58) Field of Classification Search .............. 705/37–40, 705/34
See application file for complete search history.

(56) References Cited

U.S. PATENT DOCUMENTS

| 5,383,113 | A | 1/1995 | Kight et al. | 364/401 |
|---|---|---|---|---|
| 5,699,528 | A | 12/1997 | Hogan | 395/240 |
| 5,761,650 | A | 6/1998 | Munsil et al. | 705/34 |
| 5,832,460 | A | 11/1998 | Bednar et al. | 705/27 |
| 5,845,267 | A | 12/1998 | Ronen | 705/40 |

(Continued)

FOREIGN PATENT DOCUMENTS

EP 1122676 A1 * 8/2001

(Continued)

OTHER PUBLICATIONS

Iona Technologies PLC: "Portal Apllication Server Developer's Guide" (online-Oct. 2001) <URL:http://www.iona.com/support/docs/iportal_application_server/3.0/DevelopGuide/pdf/ipas30/developguide.pdf > Retrieved Apr. 13, 2004 -p. 4-12.p. 23-25,p. 191,p. 253-268.
McClanahan, Craig: "Struts User's Guide" Internet Archive Wayback Machine (online-Feb. 2, 2002) <URL:http://web.archive.org/web/20020202054640/http://jakarta.apache.org/struts/userGuide/index.html> Retrieved Apr. 13, 2004—para.'01.4. para. '02.4 -'02.6. para.'04.4 -'04.5.

(Continued)

*Primary Examiner* — Jagdish N Patel
*Assistant Examiner* — Kevin Poe
(74) *Attorney, Agent, or Firm* — Michael J. Cummings; Charles R. Malandra, Jr.

(57) ABSTRACT

An electronic bill presentment and payment system including an extensible, customizable, data source independent data layer for accessing a business data repository for processing billing information. The business data repositories use one or more data source formats. A business logic module generating business data requests for data from the business data repository in order to carry out processing of billing information. The business data requests are independent of the one or more data source formats of the business data repository. A data layer descriptor repository stores customizable data source descriptions for generating the data layer. The data layer is generated from the customizable descriptors in the data layer descriptor repository. The data layer module receives the data source independent business data requests and based on the request, the data layer implements a data source specific method for fulfilling the request by accessing data in the business data repository. The data layer module further returns a result back to the business logic module in data source independent format. The data layer descriptor repository preferably includes top-level listings of data sources in the system. The data layer descriptor repository further includes customized data source specifications for the each of the data sources listed in the customized set of data sources.

6 Claims, 4 Drawing Sheets

U.S. PATENT DOCUMENTS

| | | | | |
|---|---|---|---|---|
| 5,963,925 A | 10/1999 | Kolling et al. | | 705/40 |
| 6,078,907 A | 6/2000 | Lamm | | 705/40 |
| 6,263,444 B1* | 7/2001 | Fujita | | 726/25 |
| 6,282,552 B1 | 8/2001 | Thompson et al. | | 705/41 |
| 6,289,322 B1 | 9/2001 | Kitchen et al. | | 705/40 |
| 6,304,857 B1 | 10/2001 | Heindel et al. | | 705/34 |
| 6,493,685 B1* | 12/2002 | Ensel et al. | | 705/40 |
| 6,578,015 B1* | 6/2003 | Haseltine et al. | | 705/34 |
| 2003/0018954 A1* | 1/2003 | Ponticelli et al. | | 717/106 |

FOREIGN PATENT DOCUMENTS

WO     WO00/67176     9/2000

OTHER PUBLICATIONS

"IBM", Web services architecture using MVC style, Naveen Balani, Mar. 5, 2002.

"IBM", Struts, an open-source MVC implementation, Malcolm Davis, Apr. 20, 2001.

"The Jakarta Project Struts", http://jakarta.apache.org.

My Yahoo! Screenshots Apr. 26, 2002, http://my.yahoo.com.

Sun Microsystems, JDBC™ 3.0 Specification, Final Release, Jon Ellis, Linda Ho with Maydene Fisher, Oct. 2001.

* cited by examiner

DATA SOURCE INDEPENDENT INTERFACE FOR AN ELECTRONIC BILL PRESENTMENT AND PAYMENT SYSTEM

This application is a continuation under 35 U.S.C. §119(e) of a provisional application No. 60/382,707 titled, DATA SOURCE INDEPENDENT INTERFACE FOR AN ELECTRONIC BILL PRESENTMENT AND PAYMENT SYSTEM, filed on May 22, 2002, by Richard Wagner and William Clarke, the entirety of which is hereby incorporated by reference.

TECHNICAL FIELD

The present invention relates to a customizable electronic bill presentment and payment (EBPP) system capable of processing business data that may come from a variety of data sources.

BACKGROUND

Many organizations are becoming more involved in conducting business electronically (so called e-business), over the Internet, or on other computer networks. E-business calls for specialized applications software such as Electronic Bill Presentment and Payment (EBPP) and Electronic Statement Presentment applications. To implement such applications, traditional paper documents have to be converted to electronic form to be processed electronically and exchanged over the Internet, or otherwise, with customers, suppliers, or others. The paper documents will typically be re-formatted to be presented electronically using Hypertext Markup Language (HTML) Web pages, e-mail messages, Extensible Markup Language (XML) messages, or other electronic formats suitable for electronic exchange, processing, display and/or printing.

Billers who provide their customers with the option of viewing and paying their bills over the Internet have varying requirements for business content to present. In addition to varying content, different billers will want the customer interface and presentation of the billing information to have a particular "look-and-feel."

Instead of programming their own EBPP system from scratch, billers have the option of purchasing or outsourcing a pre-made EBPP system from a vendor. The biller may also hire a third party electronic billing service to provide the desired EBPP services to the biller's customers. In any of these situations, a pre-made EBPP system must be customized to meet the particular business and presentation requirements of the biller. Accordingly, a vendor who provides an EBPP solution to multiple billers needs to consider the extent to which its system can be customized, and the ease with which customization can be achieved.

FIG. 1 depicts a prior art EBPP system. In the prior art system, for one or more billers, EBPP computer system 10 controls the presentment of billing service web pages 40 over the Internet 2 to customer 1. Billing information is gathered by EBPP computer system 10 from the biller's legacy computer systems 20. Typically, billing data will be parsed by EBPP system 10 from a print stream generated by the legacy system 20, the legacy print stream being originally intended for printing conventional hard-copy bills. A preferred method for parsing billing data from the legacy print stream is described in patent application Ser. No. 09/502,314, titled Data Parsing System for Use in Electronic Commerce, filed Feb. 11, 2000, which is hereby incorporated by reference into this application.

In addition to communication via web pages 40 generated during a session, EBPP computer system 10 includes the capability of sending and receiving e-mail messages 50 to and from the user 1. Typically, system 10 will generate a message to user 1 upon the occurrence of a predetermined event. An example of such an event is a new billing statement becoming available, or the approach of a due date for an unpaid bill. EBPP system 10 is also capable of communicating with a bank or ACH network 30 to process bill payment activities.

System 10 also includes a data repository 11 in which billing data for use with system 10 may be stored in a variety of formats. Data in the repository can be organized in a database, such as the kind available from Oracle or DB2. Statement data archives may also be stored in a compressed XML format. XML is a format that allows users to define data tags for the information being stored.

The EBPP computer system 10 itself is typically comprised of standard computer hardware capable of processing and storing high volumes of data, preferably utilizing a J2EE platform. EBPP system 10 is also capable Internet and network communications. The prior art EBPP computer system 10 includes a software architecture within an application server 12 for generating and handling electronic billing functions. At a fundamental level, the software architecture of the prior art system 10 is split into two conceptual components, the front-end presentation logic 13 and the back-end servicing logic 14. The split between front-end and back-end logic 13 and 14 serves to reduce the amount of recoding necessary for the system to be customized for different billers.

The front-end presentation logic 13 is the portion of the software that is the primary Internet interface for generating web page presentations. As such, the front end presentation logic 13 includes code that is custom written to meet the specific business and presentation needs of the biller. Functionalities that might be included in front-end logic 13 are enrollment, presentation, payment instructions, and reporting.

Typically, front-end logic 13 is comprised of Java Server Pages (JSP's) that control the presentation of billing information in the form of web pages. The front-end logic JSP's also receive and respond to inputs as the customer makes is requests for various services to be provided. The JSP's can be recoded to accommodate different look-and-feel and business requirements of different billers. Within the JSP's, front-end logic 13 can also utilize Enterprise Java Beans (EJB's) that comprise objects for performing specific tasks.

The back-end services logic 14 comprises the software for functions that typically do not need to be customized for particular billers. Preferably, very little of the back-end services must be customized for a particular biller's needs. For example, back-end logic may include the software for extracting the billing data from the biller legacy billing computers 20. Similarly, logic for handling of payments with the bank or ACH network 30 and systems for generating and receiving e-mail messages will be handled in the back-end services logic 14.

As a result of the distinction between the front-end and back-end logic 13 and 14, re-coding of software to provide customization for different billers is somewhat reduced. However, a significant amount of presentation logic and some business logic must always re-written to meet a particular biller's needs. The re-coding required for customization can require a high degree of programming skill and can add expense to implementation of a biller's on-line presence. The requirement for re-writing code introduce a risk that changes to the way that a web page looks may in fact introduce a problem that could cause the content of the information being displayed to be incorrect. Another problem with this prior art system is that after a system is customized, it may be difficult to provide upgrades and future releases of the software. In order to be sure that new releases work properly, substantial efforts would be necessary to retrofit the new release with the code changes that were made for the particular customer.

As shown in FIG. 2, the prior art EBPP system 10 also included a data transfer interface 15 between the front and/or back-end logic, 13 and 14, and the data repository 140. The interface 15 includes logic for retrieving data from the data repository 140 based on requests generated by the system 10. Interface 15 is typically comprised of SQL scripts and Java code for specialized data handling functions. Since a common type of data repository is a relational database, SQL commands are usually suitable for retrieving data from repository 140. Thus, in the prior art EBPP system 10 the front and back-end logic modules 13 and 14 typically include SQL specific commands in requests passed to the data transfer interface 15. These commands are utilized by the interface 15 to retrieve the appropriate information from the data repository 140.

As with the front-end presentation logic 13 and the back-end services logic 14 discussed above, problems can arise in providing biller-centric customization to the data transfer interface 15. In implementing biller specific data retrieval needs, the data transfer interface must be reprogrammed with particular care to keep the SQL scripts and the Java code in synch. An example of a potential error occurs when a programmer might add Java code to handle an added customized field in a table, but would forget to add the field in the SQL "create table" script.

The labor and potential for errors are also a concern when billers require customization that includes access to data from their own existing, non-relational databases. For instance, user information might be stored in an LDAP repository. It may be difficult to adapt the prior art system to this sort of situation, especially since SQL code fragments existed in the requests generated by the front and back-end logic 13 and 14. As a result, in order to support a non-SQL-based data source, changes need in the front-end logic 13 and possibly the back-end logic 14. Such re-coding of logic is burdensome and error prone.

SUMMARY OF THE INVENTION

The present invention provides a customizable EBPP system whereby the business logic and presentation logic need not be changed to provide data source customization to different billers. Data source customization features are stored in repositories, preferably in XML format, whereby a data layer between business logic and the data sources is implemented based on the stored customization features. Accordingly, customization for a particular biller is achieved by changing data stored in a repository, rather than reprogramming core logic.

In order to overcome deficiencies of the prior art, an EBPP system in accordance with the present invention includes the ability to create, access and modify "persistent data", i.e. data which is primarily stored in relational databases, but which also can be stored in other kinds of data stores, such as LDAP repositories. Furthermore, a mix of kinds of data sources is supported, such as a combination of relational database sources and LDAP sources. Data access methods include adding new data, finding existing data, changing existing data, and removing data. Data access may also include the ability to specify optional filters and optional security levels, to restrict the set of affected data objects. Also, when finding existing data, the ability to specify an order in which to sort the retrieved data may also be provided.

The data layer of the present invention includes an API (Application Program Interface) so that logic utilizing the data layer (such as the business objects) are shielded from access details which are specific to the particular kind(s) of data stores being accessed (e.g. relational databases vs. LDAP repositories). An advantage of this arrangement is that changes can be made to the configuration of the underlying data stores without requiring code for business applications using the data layer to be changed.

The EBPP system in accordance with the present invention includes a business data repository storing the business data for generating the content of bills, or other documents, to customers. The business data repositories may use one or more data source formats. Processing of customer billing information is carried out in a business logic module, the business logic module generating business data requests for data from the business data repository. The business data requests are preferably independent of the one or more data source formats of the business data repository.

Another repository called a data layer descriptor repository stores customizable data source descriptions for generating a data layer module. Preferably, the data source descriptions are in XML format. The data layer module generated from the descriptors in the data layer descriptor repository interfaces between the business logic module and the business data repository. The data layer module receives the data source independent business data requests. Based on the request, the data layer implements a data source specific method for fulfilling the request by accessing data in the business data repository. The data layer module further returns a result back to the business logic module in data source independent format.

The data layer descriptor repository preferably includes a top-level listing of data sources comprising a customized set of data sources for a particular biller. In addition, the data layer descriptor repository includes customized data source specifications for the each of the data sources listed in the customized set of data sources. Within the specifications, a data source independent mapper receives data requests from the business logic module. The mapper then selects a data source specific implementation within the data layer, the data source specific implementation acting upon the data in the business data repository.

Using the preferred embodiment of the present invention data-source specific code is isolated to the data layer. The automatic generation of the data layer from stored specification also ensures that Java code for database access is self-consistent and synchronized with SQL scripts, and ensures that billers can customize and extend the database to be specific to their business.

Other variations on the basic invention will be described in the detailed description and the enumerated claims below.

BRIEF DESCRIPTION OF DRAWINGS

The present invention is illustrated by way of example, in the figures of the accompanying drawings, wherein elements having the same reference numeral designations represent like elements throughout and wherein.

DETAILED DESCRIPTION OF THE INVENTION

Reference is made to a previously filed U.S. patent application Ser. No. 10/153,105, entitled CUSTOMIZABLE ELECTRONIC BILL PRESENTMENT PAYMENT SYSTEM AND METHOD, by Robert Laprade, et al., filed May 22, 2002, to application Ser. No. 10/184,159 entitled CUSTOMIZABLE SOFTWARE AGENTS IN AN ELECTRONIC BILL PRESENTMENT AND PAYMENT SYSTEM, and to application Ser. No. 10/185,924 entitled TEMPLATE FOR INPUTTING CUSTOMIZED PROCESSING FEATURES IN AN ELECTRONIC BILL PRESENTMENT AND PAYMENT SYSTEM, both by Andrew Tosswill and filed Jun. 28, 2002. These referenced patent applications are hereby incorporated by reference.

A preferred customizable EBPP system for use with the present invention is described in patent application Ser. No. 10/153,105, listed above. The invention description herein provides a further enhancement for a customizable, extensible, and data source independent, data source interface for such an EBPP system.

Figure 1:
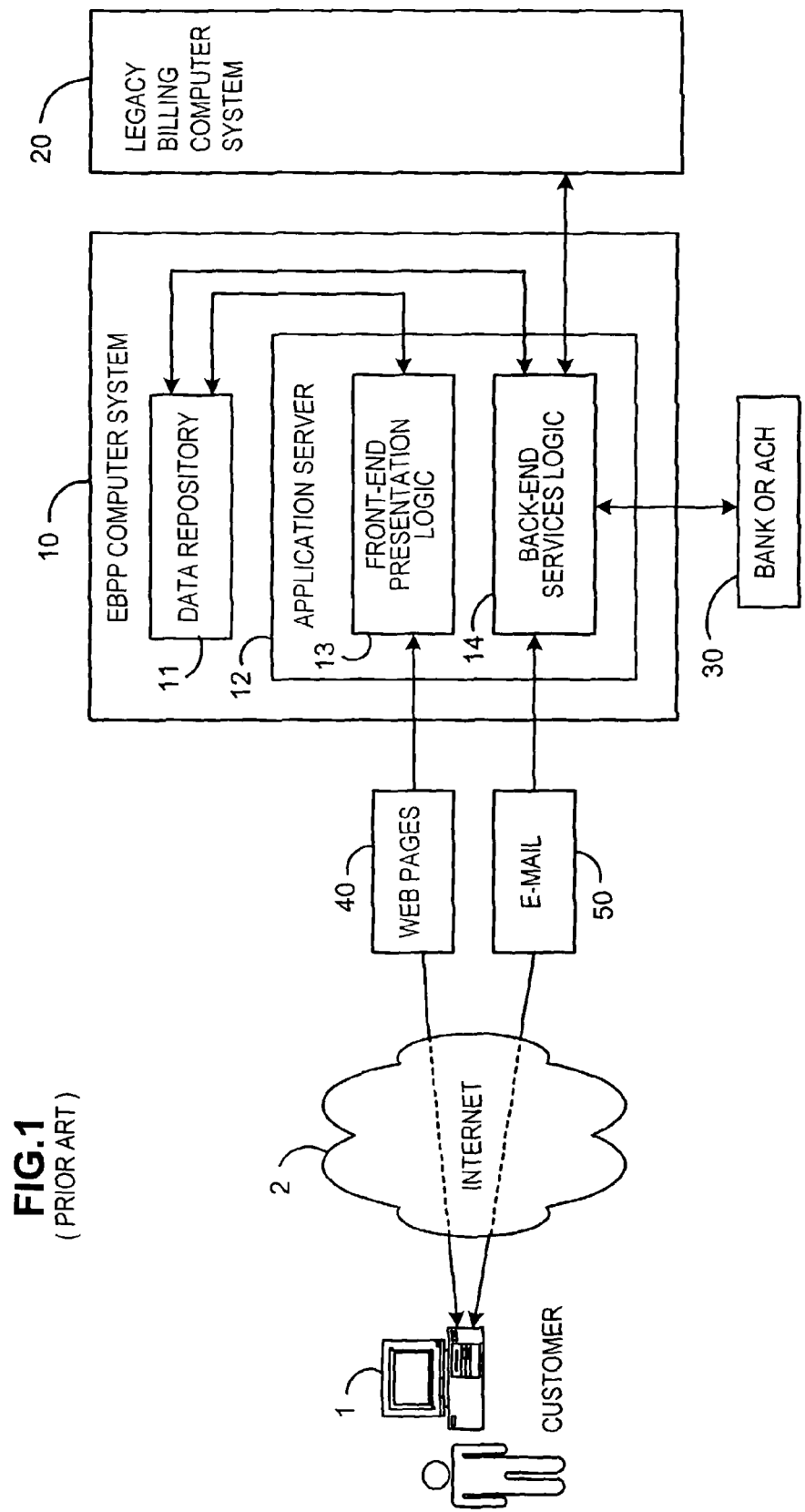
FIG. 1 is a prior art EBPP system.
Figure 2:
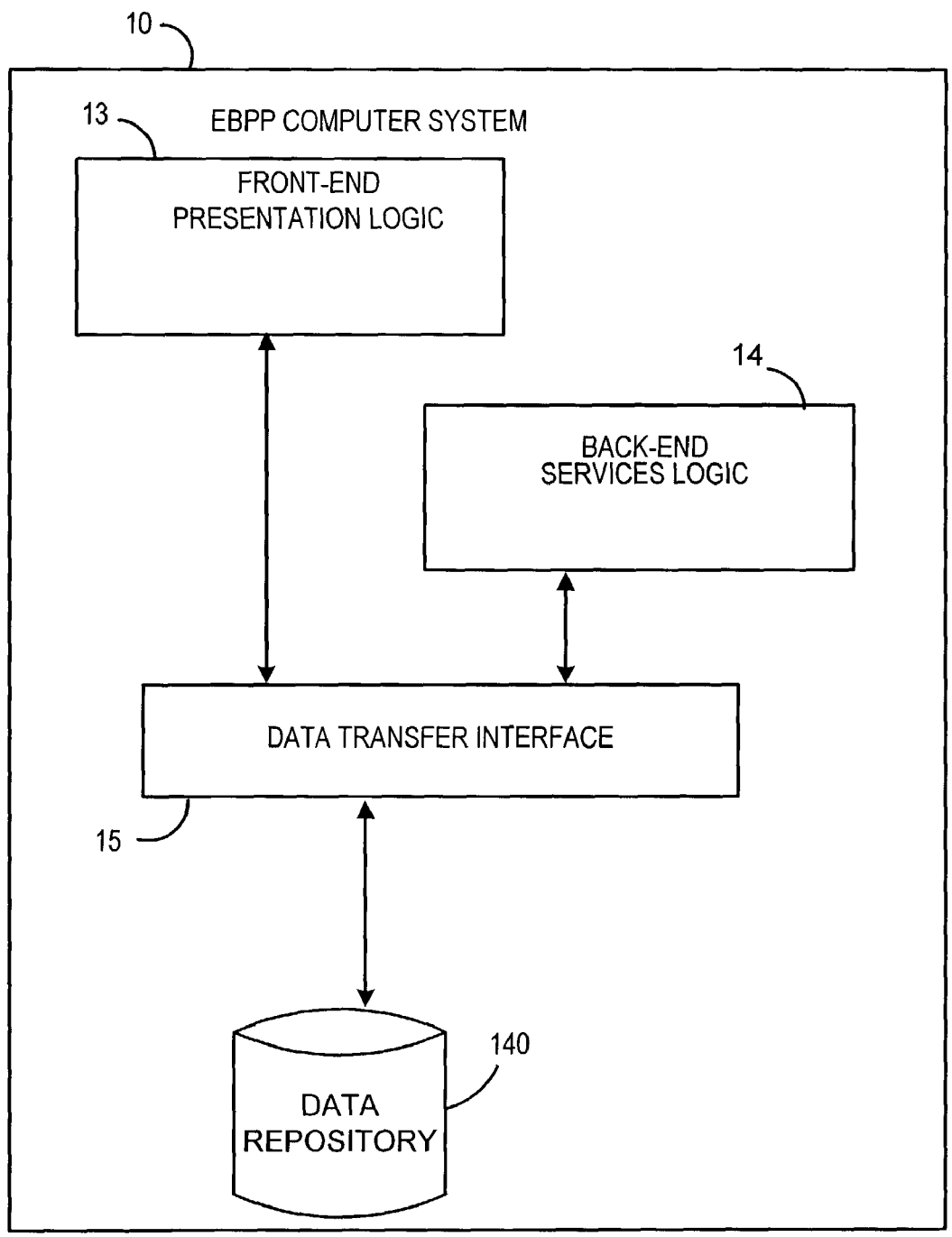
FIG. 2 is a depiction of a data interface in a prior art EBPP system.
Figure 3:
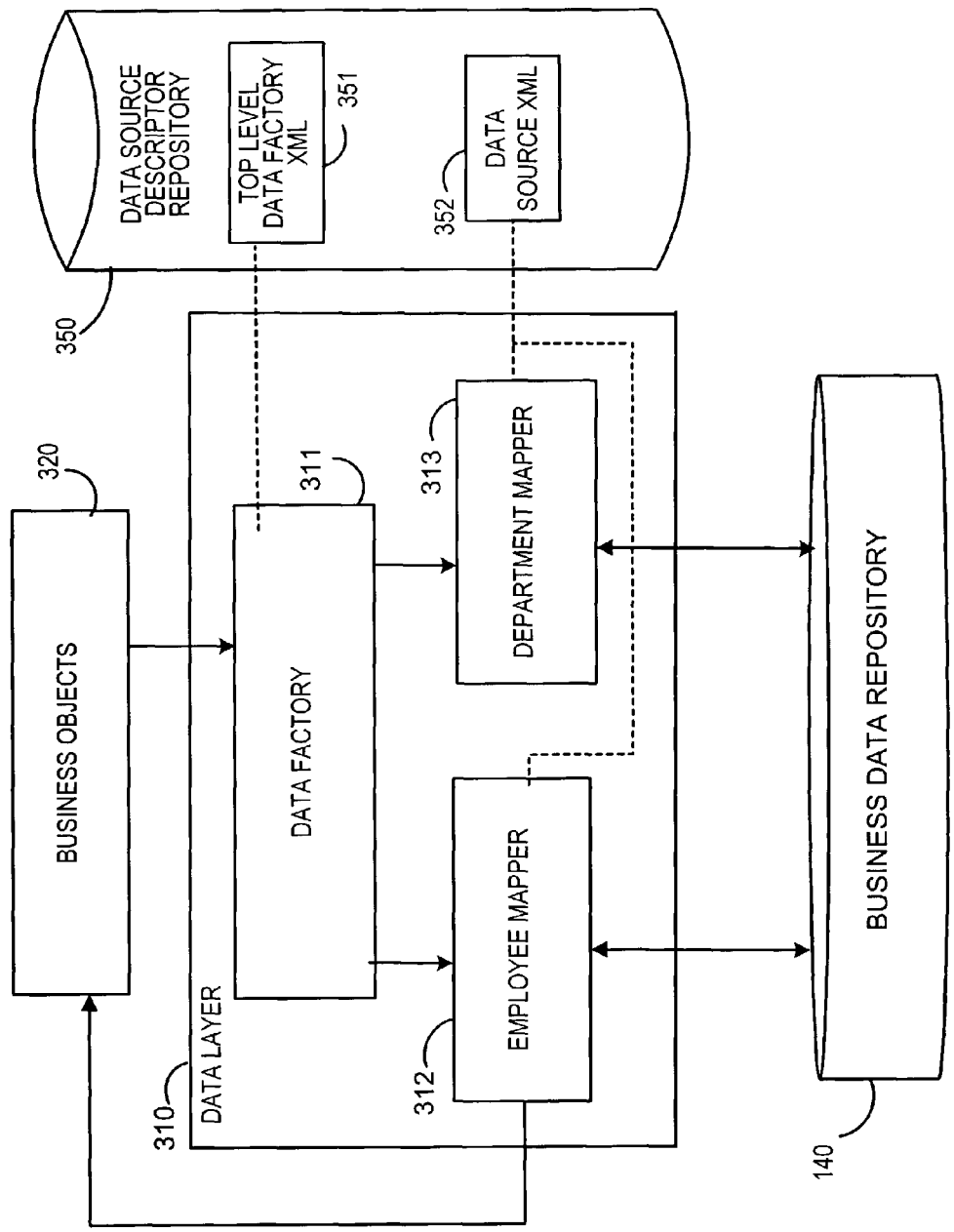
FIG. 3 depicts an exemplary data layer for an EBPP system in accordance with the present invention.

In the preferred embodiment of the present invention, as seen in FIG. 3, the business objects 320 of the EBPP system interact with a data layer 310. Data layer 310 includes sets of logic instructions that control access to the information in the business data repository 140. In some circumstances, business data repository 140 may actually be more than one data source, the data sources having different properties. Thus, the data layer 310 preferably allows the business objects 320 to access and process the information regardless of which of the types of data stores is being used. The data layer 310 also shields the business objects 320 from access details specific to the particular kind(s) of data stores being accessed. Under this arrangement, changes can be made to the configuration of the underlying data stores without requiring users (like business objects 320) of the data layer 310 to change their code.

For instance, the data layer 310 may be configured to get data from an Oracle database, or an LDAP server, or "off-line" simulation data, or a combination of those. However, the same code exists in the business objects 320, regardless of the configuration of the underlying data storage.

The data layer 310 in accordance with the present invention preferably consists of Java code and SQL scripts which, in combination, provide the required data access functionality between the business objects 320 and business data repository 140. To hide data-store-specific details from users of the data layer 310, it provides a data-source independent API to the underlying Java-based implementation. To accomplish data-source independence, when business objects 320 declare Java variables to refer to data layer 310 objects, the API requires those variables to be declared as having data-source independent Java "interface" types. The actual objects conforming to those interfaces contain the data-source-specific logic for accessing the particular data sources 140 in the system. However, as far as users of the data layer 320 object variables are concerned, the particular kind of object is hidden. All those users know is that: they can call any of the methods defined in the Java interfaces, but how those methods are implemented depends on the data-source-specific logic in the actual object referred to by the variable.

As ongoing examples throughout this description, it will be assumed that the business data repository 140 includes data sources for information relating to "employee data" and information relating to "department data." In these ongoing examples, the business objects 320 will need to retrieve employee and/or department information from the business data repository 140. The selection of "employee" or "department" data for these examples is arbitrary and any type of data may be substituted.

Figure 4:
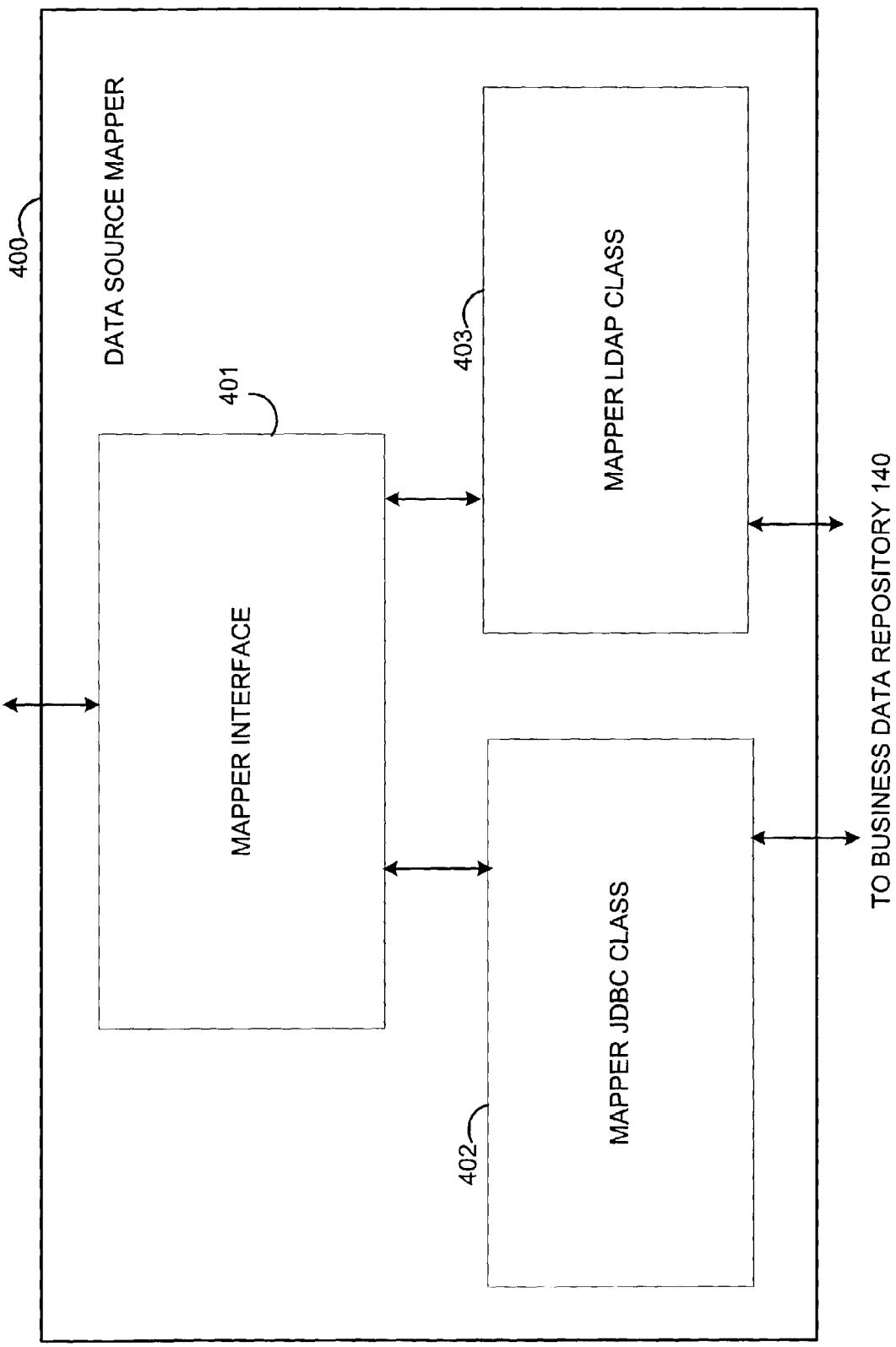
FIG. 4 depicts an exemplary generic mapper object for use in a data layer in an EBPP system using the present invention.

In FIG. 4, a preferred embodiment of a data source mapper 400 is depicted. The data source mapper 400 is a generic version of the employee mapper 312 or the department mapper 313, shown in FIG. 3. Within the data source mapper 400 a mapper interface 401 provides the data source independent means for interfacing with the business data to be retrieved. The mapper interface 401 can receive data source independent requests, or generate data source independent outputs to send back to business objects 320. The mapper Jdbc class object 402 includes the data source specific commands for accessing data sources comprised of a relational database. Similarly, the mapper LDAP class object 403 handles accessing LDAP data sources. Depending on which type of data source is required by a particular biller for the particular type of information the mapper interface 401 or the data factory 311 will make the appropriate call to either of the mapper classes 402 or 403.

In describing a first embodiment of the invention, an exemplary call to invoke an "insert" method for an "employee" data source is made from the business object 320 to the data layer 310. The call is passed to the employee mapper module 312, typically through the data factory 311. Alternatively, if the call had been for accessing data in the "department" data source, then the department mapper module 313 would have been used.

Within the employee mapper module 312 the call is directed to the "insert" method that's declared in the "EmployeeMapper" Java interface corresponding to interface 401 in FIG. 4. The "insert" call is made via a Java variable that's declared to be of type, EmployeeMapper (the interface). However, at run-time, that variable points to a particular kind of EmployeeMapper object such as objects 402 or 403 in FIG. 4. In this particular example, the object is called an EmployeeMapperLdap object, which contains logic for getting at employee data stored in an LDAP repository. The alternate object, corresponding to mapper Jdbc class object 402, would be called EmployeeMapperJdbc and contain logic for accessing employee data stored in a relational database. Since both the LDAP and JDBC-based objects implement the EmployeeMapper interface 401, the EmployeeMapper variable could, in fact, point to either object and the business object 320 calling the EmployeeMapper methods would not know the difference.

The data layer 310 API provides mapper objects (like 315, 316, 318, and 319) which include methods for: adding new data; finding existing data; changing existing data; and/or removing data. Such mapper objects may be invoked by the business objects 320. Data access can include optional "filter" objects which restrict the set of affected data objects. An optional security level can further restrict the set of affected data objects. Also, when finding data, an ordering object can also be specified, for the sake of determining the order in which to sort the retrieved data.

Like the mapper objects, the filter objects, security levels and ordering objects all expose interfaces which are data-source independent. So for example, instead of the data layer 310 user specifying a SQL "where" clause for the sake of filtering objects in a data "find" operation, a data layer user, like business object 320, constructs a filter object which is passed to the "find" method, and—if the "find" method retrieves from a relational database—then the filter object is translated within the data layer 310 to the appropriate "where" clause.

This preferred strategy of using a data-source independent interface (like interface 401) to invoke data-source-dependent method implementations is used throughout the data layer 310 and not just for the exemplary mapper objects. In the preferred embodiment, to get a handle on a mapper 312 or 313 in the example above, the user 320 invokes a "getEmployeeMapper" method in a data factory object 311. A data-source-independent "DataFactory" interface in data factory 311 is what is seen by the user.

Within data factory 311, the data-configuration-dependent object of the class DataFactoryJdbc is what the user actually manipulates via the DataFactory interface. (In the example provided herein, the DataFactoryJdbc class provides mapper objects, like those in 312 and 313, which are JDBC-based and designed to get data from relational databases. Other factory implementations could produce mappers which get data from other sources, like LDAP repositories, or even a mix of kinds of data-sources.)

In accordance with the present invention, in part to avoid problems associated with the maintaining the data layer 310 code by hand, the majority of the data layer 310 Java code and SQL scripts are generated automatically. In the preferred embodiment, XML-based descriptions of the data layer 310 data sources are maintained by hand, and XSLT scripts are then used to transform those XML-based specifications to the required SQL scripts and Java code. The XML-based specification are preferably stored in a data source descriptor repository 350. In particular, all of the Java code for all of the data factory 311, mapper 400, and data objects described above is generated from the XML-based specifications in repository 350. Thus if customization requires that a field be added to a data source, only one file is changed by hand (the XML specification for the data source), and the XSLT scripts then make sure that the new SQL and Java code fragments for the field all get generated properly in data layer 310.

As a result of this arrangement, the specification of the persistent data store is readily extensible. For example, if a typical EBPP system required a table named "SampleTable", and the system used three fields in the table, named "A", "B" and "C". Then the "SampleTable" data object interface would include method declarations for getting and setting all three fields. So, for instance, there would be a "geta" method and a "seta" method, and the "SampleTable" Java interface would connect to actual objects of the class, "SampleTableImpl".

However, if a particular biller would like to extend "SampleTable" so that it includes an additional, fourth field named "D", that would still be possible. That biller could add the XML for field "D" to the XML-based specification of "SampleTable", and the XML would be changed to indicate that it represents an extension to "SampleTable". The Java and SQL code for (say) "SampleTableExtended" could then be generated using the data layer 310 XSLT scripts. The same "SampleTable" interface could still be used by the EBPP system, even though that interface would (in this case) now be connected to objects of the class, "SampleTableExtended", instead of the "SampleTableImpl" class. That's because both the regular "impl" class and the extended class implement all of the "get" and "set" methods for the "base" three fields ("A", "B" and "C"): the fact that "SampleTableExtended" objects also include access methods for the additional "D" field doesn't hinder the pre-existing code in the system from getting at the three fields it expects and requires.

Typically, an EBPP system will use data residing in SQL-based databases (e.g. Oracle). As such the data source descriptor repository will include an XML-based data specification in which for each database table, a corresponding XML file describes the table and each of the table's fields (including "foreign fields" in other tables which are related to via primary key references). XSLT scripts not only generate several Java sources for each XML file, but XSLT scripts also generate the SQL scripts to create the tables and views for that data. The accuracy of the XML specifications is more easily regulated than the large volume of generated Java and SQL code.

Automatically generating the Java and SQL in data layer 310 also has the benefit of ensuring the consistency between the two. For example, field names appear in both the SQL scripts and the Java source. If both were maintained by hand, it would be easy to mistakenly change the name in one place but not the other. Using XML means such changes can be done in one place, and the code generators take care of guaranteeing that all required changes get propagated throughout the Java and SQL.

The extensibility of the data layer 310 is also partly due to its code generation. Parties seeking to customize the EBPP system benefit from the XML specifications' conciseness and abstraction. The flexible and relatively simple XML specification, allows avoidance of more extensive and lower-level changes throughout the Java and SQL code.

The data layer 310 extensibility is also due to the design of its Java classes. Subclassing as a potential means of customizing data layer 310 behavior is a design consideration.

A benefit of using the specifications in the data source descriptor repository 350 is that SQL scripts in data layer 310 are generated from the same database-independent XML description, so differences at the SQL level between relational databases (in data type names, for instance) are taken care of automatically by the Data Layer's SQL generation.

The data layer 310 provides a high level API that abstracts away most of what is needed to manage SQL details. For example, a single data object retrieved by the data layer 310 might be constructed from records in several different underlying relational database tables. At the SQL level, tables, views and relationships between foreign keys and records all need to be managed. This management is handled automatically by the generated SQL instructions.

In examples provided above, two exemplary data sources were discussed. These examples will be discussed in greater detail to provide a description of a preferred interaction of the data sources and the data source descriptor repository 350.

The exemplary "employee" data source is a persistent data store which holds records about employees at a company. For this example, the attribute names and types for employee data are:

EmployeeId (a long)
Name (a string)
Address (a string)
Hire Date (a date)
Department ID (an index into the Department data source, described next)

The second exemplary data source relating to department data holds records about departments in a company. The attributes of a department are:

DepartmentId (a long)
Name (a string)
Description (a string)

To provide access to the employee and department data sources, the data layer 310 requires each to be described in a set XML-based files known as a Data Source XML Specification 352. The Java source code files in the data layer 310 are needed to access and modify those two data sources in business data repository 140. Similarly, the SQL scripts in data layer 310 are needed to manage create (and clear, destroy, etc.) those sources (if a relational database is chosen as each store's implementation). The Java code and SQL scripts are generated using XSLT scripts in the data layer 310. The Data Source XML 352 Specification for these sample data sources are described further below.

The Java objects in the data layer 310, generated as a result of the descriptions in the data source descriptor repository 350, are preferably comprised of several different types. To get at the "employee" and "department" data sources specialized Java objects corresponding to each data source are required. Thus the employee mapper 312 and department mapper 313 are generated based on the data source XML 352. These mappers 312 and 313 must be able to access varying types of underlying storage including relational databases, LDAP repositories, flat-file storage systems, etc. Inherently, if one data source accesses a relational database, while another accesses an LDAP repository, then the implementations of the Java objects for those data sources must use different code. Thus different Java classes for each data source, e.g. one class that includes JDBC code to access the underlying relational database, and another class with JNDI code to access the underlying LDAP repository is preferably used.

However, to provide the necessary data-source independence, mapper interfaces, such as interface 401, are necessary. As a result, for each data source, the data layer 310 provides a data-source independent Java interface, and data-source dependent Java classes (like 402 and 403) that implement that interface. The interface 401 serves to map data-source independent requests from the user to the method implementing that request in the underlying data-source dependent class.

For example, for the "employee" data source, the data layer 310 may provides a data-store independent EmployeeMapper Java interface (corresponding to interface 401) which declares all of the methods that can be used to access, modify and/or remove employees from the underlying data source. For use when employee data is stored in a relational database, the data layer 310 provides an EmployeeMapperJdbc Java class (402) which implements the EmployeeMapper interface (401). Similarly, for the "department" data source, the data layer 310 provides a data-store independent DepartmentMapper Java interface (401) and a DepartmentMapperJdbc Java class (402) which implements the DepartmentMapper interface (401).

Requiring users to call only those methods declared in the mapper interfaces means that alternate mapper implementation classes can be "swapped in" for existing classes 402 and 403 at some point, without having to change any of the code that wants to use the corresponding data source. So for example, if an LDAP-based implementation was required for the "employee" data store, then an object of a new EmployeeMapperLdap Java class (403) could be exchanged for an older JDBC-based object (402), as long as the new EmployeeMapperLdap object (403) implemented the methods in the EmployeeMapper interface (401).

In order to identify the appropriate data-store-specific Java class without naming that class, the data layer 310 utilizes a data factory object 311. Data factory 311 is preferably an object implementing a DataFactory interface that's generated by the data layer from the data source descriptor repository 350. That data factory 311 interface contains one get {DataSource} Mapper method for each data source listed in the Data Source XML 352 Specification. Each method in data factory object 311 contains the data-source specific code for producing a mapper 400 for the type of the underlying data-store.

So for the sample source specification with the "employee" and "department" data sources, the generated data factory 311 interface would contain getEmployeeMapper and getDepartmentMapper methods. Therefore, to initialize an EmployeeMapper variable, one "asks" a DataFactory object for such a mapper as shown in the following example:
DataFactory myDataFactory=???;
EmployeeMapper
    myMapper=myDataFactory.getEmployee-
    Mapper ( . . . );

To initialize a data factory variable, the data layer 310 automatically generates a DataFactoryJdbc class (which implements the data factory 311 interface), and each get{DataSource}Mapper method in that class constructs and returns a corresponding {DataSource}MapperJdbc object. Once the user code has a "handle" on a factory object 311 via the DataFactory interface, both the call to get the mapper 400, as well as the returned mapper 400 itself, use data-source-independent interfaces.

In an exemplary system where every data source is mapped to a relational database table, an instance of the DataFactoryJdbc class in data factory 311 would be sufficient, e.g.:
DataFactory myDataFactory=new DataFactoryJdbc( );
EmployeeMapper
    myMapper=myDataFactory.getEmployee-
    Mapper ( . . . );

It is possible customize the code to initialize the DataFactory variable so that it's easier to make data source implementation changes. For example, instead of invoking a constructor of a particular DataFactory class, the above "new DataFactoryJdbc( )" code could be replaced code which invokes a constructor (using Java's reflection API) based on the name of a DataFactory class which is read at run-time from a system property, or the like. That named DataFactory class could be a subclass of DataFactoryJdbc, but which overrides only those methods which—for instance—return mappers 400 for data sources that are non-JDBC based (e.g. LDAP-based mappers):
String             factoryName=System.getProperty
    ("D3.DataFactory");
Class factoryClass=Class.forName (factoryName);
DataFactory       myDataFactory=factoryClass.newinstance( );
EmployeeMapper
    myMapper=myDataFactory.getEmployeeMapper ( . . . );

In all of the examples provided herein, there are typically four kinds of operations performed by mapper objects 400: find, insert, update and remove methods. Thus they may be substituted for each other throughout the description. Essentially, the purposes of these methods are self-explanatory. For instance, the "find" methods provide the means for accessing 0, 1 or more records in the data store underlying a mapper interface 401.

The methods of a mapper 400 both return and take as parameters objects that represent individual records from the mapper 400 underlying data store in business data repository 140. For instance, the "find" methods return objects that represent 0 or more records, and the "insert" methods include parameters that represent individual objects to add to a data store.

Mappers 400 preferably provide several overloaded methods which are all named find. In particular, some require as a parameter a list of the desired fields (or "columns") that should be retrieved, while the others get complete records, populated with data from all of the existing fields. Both kinds of find, however, return objects which represent 0, 1 or more records.

When requesting all fields, the kind of "record-set" object that's returned by the mapper 400 is called a "Data Object Set", and for a particular data-source's mapper 400, the name for such an object is {DataSource}Set. For instance, the EmployeeMapper interface includes find methods which return EmployeeSet objects.

In the examples provided herein, EmployeeSet and DepartmentSet are names of Java interfaces. As with data factories 311 and mappers 400, those interfaces are independent of the type of underlying data store; exemplary object classes that implement those interfaces for JDBC-based relational data stores may be named EmployeeSetJdbc and DepartmentSetJdbc.

Essentially, a Data Object Set's methods provide the means for iterating through the objects in the set. For example, the getNextDepartment method of a DepartmentSet yields a single object of the class, Department.

Individual Data Object classes, like Employee and Department, actually store the in-memory values of all the field values for the corresponding data-store record. In addition, though, when a data record includes foreign key fields that "point" to records in other data stores, some or all of those referenced "foreign fields" can actually be included in the Data Object. Methods to get and set fields, and to get foreign fields, are included in each Data Object's class.

Because an exemplary Employee record includes a "DepartmentId" foreign key, the XML description for the Employee data source in the data source XML 352 requires that Employee objects should automatically include the Name and Description fields from the Department record referenced by the employee's "DepartmentId" foreign key. Here is an exemplary list of the fields and foreign fields stored in an Employee object:

EmployeeId ("long" field)
Name ("String" field)
Address ("String" field)
Hire Date ("Date" field)
Department ID ("long" field)
Name ("String" foreign field, from the Department data source via the Department ID)
Description ("String" foreign field, from the Department data source via the Department ID)

When using the "find" method of a mapper 400 which takes a list of desired field/column names, the object that's returned is of a different class called SelectionListData. Conceptually, selection-list objects are more like objects that represent tables, with each row containing String values—one per column—for the retrieved fields. The fact that a selection-list's columns are Strings makes them easier to use if simply displaying the field values is all that's required. However, if one needs to manipulate the field values using their "native" types (for instance, if you need to use "Date" class methods on an employee's "HireDate"), then it makes more sense to use a "find" method that returns Data Objects, since their "get" methods don't always return Strings, and instead return field values as objects of their native classes.

Within data source descriptor repository 350, a complete XML-based description of a system's data sources preferably consists of one Data Source XML 352 Specification per data source, and a single, overall Top-Level Data Factory XML 351.

An exemplary, Data Source XML 352 Specification for the Employee data source is as follows:

```xml
<?xml version="1.0" encoding="UTF-8"?>
    <table name="Employee"
                xmlns:xsi=http://www.w3.org/2001/XMLSchema-instance
                xsi:noNamespaceSchemaLocation='../Table_Schema.xsd'>
        <fields>
            <field name="Name"            type="String" size="64" mandatory="true"/>
            <field name="HireDate"        type="Date"/>
            <field name="Address"         type="String" size="128"/>
            <field name="DepartmentId"    type="long"   mandatory="true">
                <foreign_table name="Department">
                    <foreign_field name="DepartmentName"
                            foreignName="Name" type="String"/>
                    <foreign_field name="DepartmentDescription"
                            foreignName="Description" type="String"/>
                </foreign_table>
            </field>
        </fields>
        <primary_key name="EM_PK">
            <field href="EmployeeId"/>
        </primary_key>
        <indices>
            <index name="EMDepartmentId_Idx">
                <field href="DepartmentId"/>
            </index>
        </indices>
    </table>
```

In addition to the Data Source XML 352 Specification for each data source, a Top-Level Data Factory XML 351 Specification is needed to tie all the data sources' XML specifications together. An exemplary "WorkOut_Sample_Schema.xml", which is the top-level specification for the exemplary Employee and Department sources is as follows:

```xml
<?xml version="1.0" encoding="UTF-8"?>
<app_schema name="WorkOut" schema_version="1.0"
        xmlns:xsi="http://www.w3.org/2001/XMLSchema-instance"
        xsi:noNamespaceSchemaLocation='WorkOut_Schema.xsd'>
    <release_version major="2" minor="1" maintenance="0"/>
    <data_schema>
        <tables>
            <table_link name="Employee"/>
```

```
        <table_link name="Department"/>
    </tables>
    </data_schema>
</app_schema>
```

In this exemplary embodiment, the Top Level Data Factory XML 351 generate SQL scripts that further creates tables to further generate the Java code and SQL to be incorporated in the data layer 310. This Top Level Data Factory XML 351 deals with tables (createTables.sql, for example), as opposed to the Java code and SQL scripts which deal with individual data sources ({TABLE_NAME}Create.sql, for example). The Top Level Data Factory XML 351 specification provides the complete list of data source names required to generate the higher-level SQL scripts.

The following table lists all of the files generated from an exemplary the Top Level Data Factory XML 351 file named {TABLE_NAME}.xml:

| Input XML:   | {TABLE_NAME}.xml            |
|--------------|------------------------------|
| Output Java: | {TABLE_NAME}.java            |
|              | {TABLE_NAME}Data.java        |
|              | {TABLE_NAME}Mapper.java      |
|              | {TABLE_NAME}MapperJdbc.java  |
|              | {TABLE_NAME}Set.java         |
|              | {TABLE_NAME}SetJdbc.java     |
| Output SQL:  | {TABLE_NAME}Create.sql       |
|              | {TABLE_NAME}ViewCreate.sql   |

In the preferred embodiment, to transform a complete XML-based Data Source Specification to Java and SQL files, scripts written in XSLT are used. In this embodiment, XSLT processor used by the Data Layer is the "Xalan" processor, known in the art.

While the present invention has been described in connection with what is presently considered to be the preferred embodiments, it is to be understood that the invention is not limited to the disclosed embodiment, but is intended to cover various modifications and equivalent arrangements included within the spirit and scope of the appended claims.

What is claimed is:

1. An electronic bill presentment computer system for processing business data to determine customer billing information and for providing the customer billing information to a remote customer over a network, the electronic bill presentment computer system comprising:

one or more memory devices comprising a business data repository, the business data repository storing business data using a plurality of data source formats, one or more memory devices comprising a data layer descriptor repository including customizable data source descriptions for generating a data layer module on one or more computers in the system;

one or more computers comprising a business logic module for processing customer billing information, the business logic module generating business data requests for data from the business data repository, the business data requests being independent of the plurality of data source formats of the business data repository;

the data layer module, generated based on the data layer descriptor repository, interfacing between the business logic module and the business data repository, the data layer module receiving the data source independent business data requests and implementing a data source specific method for fulfilling the business data requests with data from the business data repository, the data layer module returning a result back to the business logic module in data source independent format; wherein the data layer descriptor repository includes a top-level listing of a plurality of data sources comprising a customized set of data sources for a particular biller;

wherein the data layer descriptor repository includes customized data source specifications for each of the plurality of data sources listed in the customized set of data sources; and wherein the data layer module includes a data source independent mapper for receiving data requests from the business logic module, the mapper selecting a data source specific implementation within the data layer, the data source specific implementation acting upon the data in the business data repository.

2. The system of claim 1 wherein the customized data source descriptions in the data layer descriptor repository are in XML format.

3. The system of claim 2 wherein the data layer module is comprised of Java code and SQL scripts for accessing the one or more data source formats.

4. A method for accessing business data in an electronic bill presentment computer system processing business data to determine customer billing information and for providing the customer billing information to a remote customer over a network, method comprising:

storing business data using a plurality of data source formats in a business data repository comprising one or more memory devices, storing customizable data source descriptions in a data layer descriptor repository comprising one or more memory devices;

on one or more electronic bill presentment computers, processing customer billing information based on business data retrieved from the business data repository;

on one or more electronic bill presentment computers, generating business data requests for data from the business data repository, the business data requests being independent of the plurality of data source formats of the business data repository;

interfacing between a business logic module, on one or more electronic bill presentment computers, and the business data repository, the step of interfacing including receiving the data source independent business data requests and implementing a data source specific method for fulfilling the business data requests with data from the business data repository, the step of interfacing based on the customizable data source descriptions from the data layer descriptor repository;

returning a result back in data source independent format for use in the step of processing;

wherein the step of storing customizable data source descriptions includes storing a top-level listing of a plurality of data sources comprising a customized set of data sources for a particular biller;

wherein the step of storing customizable data source descriptions includes storing customized data source specifications for each of the plurality of data sources listed in the customized set of data sources; and wherein the step of interfacing includes selecting a particular class of instructions based on a type of the plurality of data source formats in the business data repository.

5. The method of claim 4 wherein the step of storing customized data source descriptions in the data layer descriptor repository includes storing the descriptions in XML format.

6. The method of claim 5 wherein the step of interfacing is carried out by interfacing instructions comprised of Java code and SQL scripts for accessing the one or more data source formats.

* * * * *